(12) United States Patent
Cadeddu

(10) Patent No.: US 8,522,935 B2
(45) Date of Patent: Sep. 3, 2013

(54) VALVE FOR THE BRAKING BALANCEMENT, FOR A FARM TRACTOR OR A SIMILAR VEHICLE

(75) Inventor: Leonardo Cadeddu, Crema (IT)

(73) Assignee: VHIT S.p.A. Unipersonale, Offanengo (IT)

( * ) Notice: Subject to any disclaimer, the term of this patent is extended or adjusted under 35 U.S.C. 154(b) by 235 days.

(21) Appl. No.: 12/744,705

(22) PCT Filed: Dec. 12, 2008

(86) PCT No.: PCT/EP2008/010839
§ 371 (c)(1),
(2), (4) Date: May 26, 2010

(87) PCT Pub. No.: WO2009/077190
PCT Pub. Date: Jun. 25, 2009

(65) Prior Publication Data
US 2010/0300823 A1 Dec. 2, 2010

(30) Foreign Application Priority Data
Dec. 18, 2007 (IT) .............................. TO2007A0908

(51) Int. Cl.
*F16J 15/00* (2006.01)

(52) U.S. Cl.
USPC .......................................... 188/345; 277/587

(58) Field of Classification Search
USPC ............. 188/345, 151 R; 277/436, 438, 439, 277/467, 579, 580, 584, 586, 587, 589, 582; 92/168; 60/561, 581
See application file for complete search history.

(56) References Cited

U.S. PATENT DOCUMENTS

| | | | | |
|---|---|---|---|---|
| 2,420,104 A | * | 5/1947 | Smith | 277/453 |
| 2,593,193 A | * | 4/1952 | Rockwell | 277/587 |
| 3,118,682 A | * | 1/1964 | Fredd | 277/584 |
| 3,146,683 A | * | 9/1964 | Hoffmann | 92/155 |
| 3,377,076 A | * | 4/1968 | Burnett | 277/582 |
| 3,455,566 A | * | 7/1969 | Hull et al. | 277/582 |
| 3,531,132 A | * | 9/1970 | Lissau | 277/436 |
| 3,568,441 A | | 3/1971 | Walker | |
| 3,663,024 A | * | 5/1972 | Traub | 277/589 |
| 3,765,690 A | * | 10/1973 | Sievenpiper | 277/556 |
| 3,885,391 A | | 5/1975 | Campbell et al. | |

(Continued)

FOREIGN PATENT DOCUMENTS

| | | |
|---|---|---|
| FR | 2 192 015 | 2/1974 |
| GB | 626 222 | 7/1949 |
| JP | 57001865 A * | 1/1982 |
| JP | 57167563 A * | 10/1982 |

OTHER PUBLICATIONS

International Search Report dated Jul. 6, 2009, from corresponding PCT application.

*Primary Examiner* — Bradley King
*Assistant Examiner* — Stephen Bowes
(74) *Attorney, Agent, or Firm* — Young & Thompson

(57) ABSTRACT

A balancing valve for balancing the braking system of a vehicle equipped with two separated master cylinders for the independent braking of the wheels situated at the two sides of the vehicle, wherein at least one of two ring packings which cooperate with the intake of a transfer channel connecting both master cylinders is housed within a containment space that allows a displacement of this packing to substantially increase the volume of the space located on the packing side communicating with the transfer channel.

4 Claims, 1 Drawing Sheet

(56) References Cited

U.S. PATENT DOCUMENTS

| | | | | |
|---|---|---|---|---|
| 3,958,903 A | * | 5/1976 | Capelli | 417/503 |
| 4,229,013 A | * | 10/1980 | Burke et al. | 277/584 |
| 4,342,463 A | * | 8/1982 | Burke | 277/500 |
| 4,681,327 A | * | 7/1987 | d'Agostino et al. | 277/587 |
| 4,702,330 A | * | 10/1987 | Vatter et al. | 180/6.2 |
| 5,113,747 A | * | 5/1992 | Pignerol | 92/175 |
| 5,143,382 A | * | 9/1992 | Maringer | 277/584 |
| 5,575,484 A | * | 11/1996 | Burke | 277/436 |
| 6,938,901 B2 | * | 9/2005 | Tsuchiya et al. | 277/440 |
| 7,793,944 B2 | * | 9/2010 | Otuka | 277/611 |

* cited by examiner

VALVE FOR THE BRAKING BALANCEMENT, FOR A FARM TRACTOR OR A SIMILAR VEHICLE

The subject of this invention is a valve, intended for balancing the braking in a farm tractor or a similar vehicle, this valve having particular characteristics. The invention also concerns a master cylinder equipped with such a valve, and a vehicle whose braking system includes at least one master cylinder equipped with such a valve.

BACKGROUND OF THE INVENTION

In some vehicles, particularly farm tractors and the like, the hydraulic braking system includes two master cylinders operating as pumps, which are controlled by two separate braking pedals. Each of these master cylinders operates the braking of one of the rear side wheels (left-hand and right hand wheels) of the vehicle. This arrangement has the purpose of allowing a different braking of the side wheels, for example in order to help the vehicle rotation by the U-turn when a field is being worked along adjacent lanes which are run in alternatively opposite directions. When, on the contrary, a bilateral braking is controlled by operating both the braking pedals, in general the system could be unbalanced. because the two separate braking circuits take up different oil quantities, and the result would be a similarly unbalanced braking. In order to prevent this drawback, a transfer channel is provided that mutually communicates the two braking circuits when both the braking pedals are operated simultaneously. The balancing function is effected by balancing valves installed on the pistons of the two master cylinders, these valves normally intercepting the intakes of the transfer channel, and opening these intakes when the pistons have covered a preestablished stroke.

Therefore, in the absence of any braking action, both the intakes of the transfer channel are closed, and the braking liquid contained in this channel is confined in a closed space. In these conditions, when the transfer channel undergoes a temperature increase, the contained liquid is thermally dilated, and its volume increase causes in the closed space a pressure increase. In particular conditions, this pressure increase may take important values which are capable of damaging the balancing valves.

This phenomenon takes place, in particular, when the master cylinders, the balancing valves and the transfer channel are installed in hot regions of a farm tractor, for example within the motor hood of a coach-worked tractor, and the operation takes place in static conditions with insufficient cooling, that is the case of the operation of a water-scooping machine or other implement. In general it appears that this phenomenon takes place as a result of a temperature increase of about 60° starting from the last braking operation effected.

SUMMARY OF THE INVENTION

The main object of this invention is to improve the balancing valves in such a way that they should be capable of preventing the above stated drawback.

Another object of the invention is to attain said main object by simple and reliable technical means. Still another object of the invention is to attain the stated objects without increasing the production cost of the balancing valves and, therefore, of the braking system and the vehicle equipped with them.

According to the invention, these objects are attained in a balancing valve for the braking system of a vehicle including two separate master cylinders for the independent braking of the wheels situated at the two vehicle sides, this balancing valve including two ring packings which cooperate with the intake of a transfer channel connecting both master cylinders, characterized in that at least one of the packings of the balancing valve is housed within a containment space suitable for allowing, in elastic conditions, a displacement of this packing that increases in noticeable manner the volume of the space which is located on the packing side communicating with the transfer channel.

In this manner, when the thermal expansion causes an increase of the liquid volume contained in the transfer channel, a moderate increase in the pressure of this liquid, by acting onto said packing, gives rise to an elastic displacement of the packing within the containment space, thus resulting in an increase of the liquid containing volume, whereby there is prevented an excessive increase of the pressure, suitable for causing damages. Therefore, the balancing valve according to the invention also takes the function of a low pressure absorber.

Said packing may per se have a substantially usual shape, and the possibility of its displacement as a consequence of an elastic deformation of the packing may be entrusted entirely to the shape of the space wherein the packing is housed.

In this case it is preferred that the packing containment space has an expanded region, wherein the packing is contained when it is in its conditions of minimum elastic deformation, and it has a gradually narrowing region, wherein the packing can penetrate thanks to an increase of its elastic deformation.

As an alternative, the possibility of an elastic displacement of the packing as a consequence of its deformation can be entirely entrusted to a special shape of the packing itself.

Both stated possible embodiments may be mutually combined when both the packing containment space and the packing itself have particular shapes suitable for allowing an elastic displacement of the packing and the resulting volume increase of the space communicating with the transfer channel.

Finally, the possibility of an elastic displacement of the packing within the containment space can be ensured by an elastic means contained, along with the packing, within the containment space.

BRIEF DESCRIPTION OF THE DRAWINGS

These and other features, objects and advantages of the subject of this invention will appear more clearly from the following description of a preferred embodiment, which however has only the character of a non-limiting example, in comparison with a known arrangement, and with reference to the accompanying drawings, wherein.

DETAILED DESCRIPTION OF THE PREFERRED EMBODIMENTS

Figure 1:
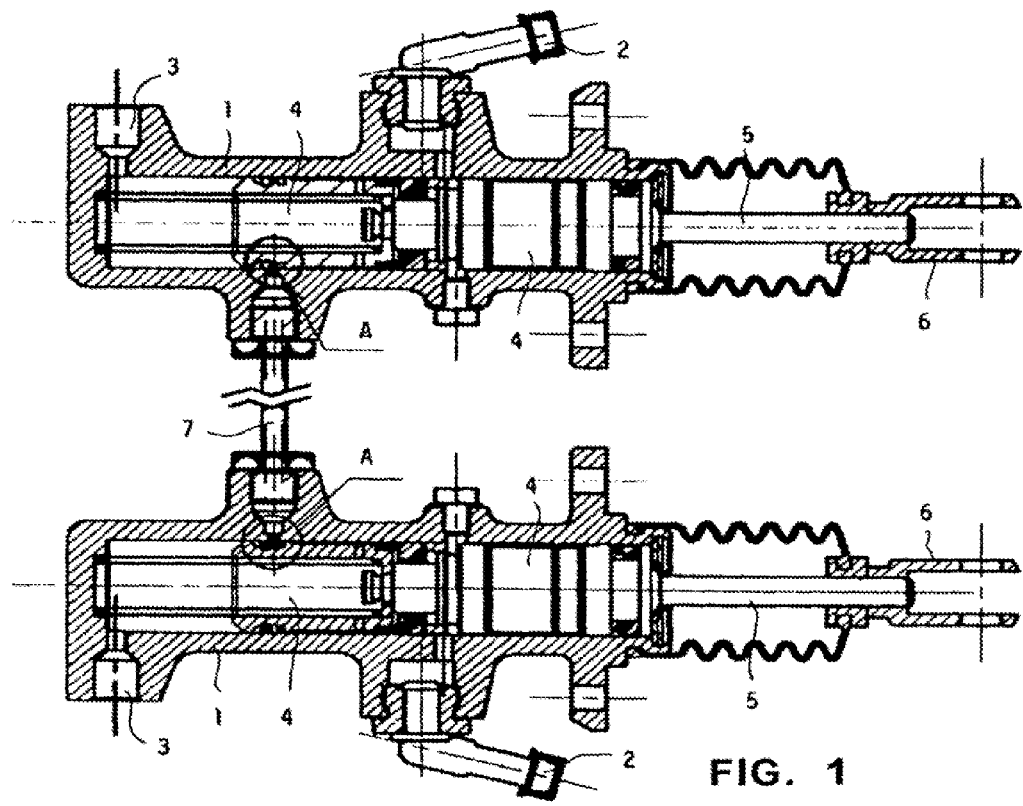
FIG. 1 shows a cross section of a pair of master cylinders connected by a transfer channel cooperating with balancing valves installed in the master cylinders.

With reference to FIG. 1, there are represented two master cylinders 1, each having a supply connection 2 and a delivery connection 3. Within each master cylinder 1 is sealingly mounted for slidable movement a piston 4 operable by a shaft 5 having a connection member 6 pivoted to a braking pedal (not shown). The supply connections 2 are connected to a supply tank for braking liquid (not shown), and each delivery connection 3 is connected to a braking circuit (not shown) ending to the brake of a side vehicle wheel and, in case, to a valve for disconnecting the braking of the front wheels and/or of the wheels of a trailer, such disconnecting valves being provided in some cases. The detailed structure and operation of these master cylinders are well known to those skilled in the art and here there is no need for a detailed description thereof.

Each piston 4 is provided with a balancing valve cooperating with the corresponding intake of a transfer channel 7 mutually connecting both master cylinders 1. The cooperation between each balancing valve and the corresponding intake of the transfer channel 7 takes place within the respective regions designed with A in FIG. 1.

Figure 2:
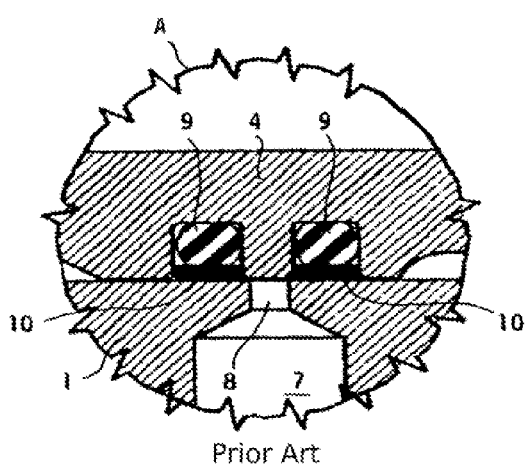
FIG. 2 shows a cross section of a known arrangement of a balancing valve.

FIG. 2 shown on a larger scale a cross section taken in the cooperation region A of a balancing valve and an intake of the transfer channel, according to the known technique.

The transfer channel 7 ends in an opening 8 provided in the body 1 of the master cylinder, this opening 8 forming the intake of the transfer channel. In the piston 4 of the master cylinder 1 are hollowed two parallel annular seats, and in each seat is housed an annular packing 9, in general a O-ring of rubber, equipped with a ring 10 for sealing and sliding, in most cases of tetrafluoroethylene. In the shown rest position, the two packings 9-10 are located at both sides of the opening 8 being the intake of the transfer channel 7. When the braking operation is started, piston 4 displaces (toward the left-hand side according to the Figure), and one of the packings 9-10 goes beyond the opening 8 and opens the communication between the transfer channel 7 and the inner volume of the master cylinder 1. In the shown rest position, both packings 9-10 delimit around the piston an annular space which communicates with the inner space of the transfer channel 7. The total space in which is confined the liquid contained in the transfer channel 7 is practically invariable and, for this reason, a thermal expansion due to a heating of said liquid gives rise to a pressure increase, which may take an amount capable of applying to the packings 9-10 a force sufficient for damaging, expelling or drawing out the same.

Figure 3:
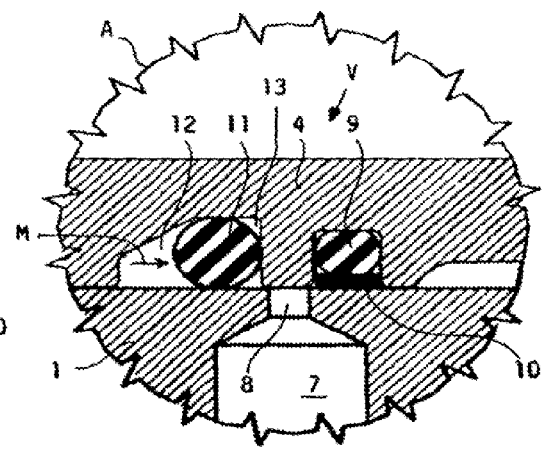
FIG. 3 shows a cross section, similar to FIG. 2, of a balancing valve embodied according to the present invention.

FIG. 3 shows, on a larger scale as FIG. 2, a cross section taken in the cooperation region A of a balancing valve V and the intake 8 of the transfer channel 7, according to the present invention.

The transfer channel 7 still ends in an opening 8 provided in the body 1 of the master cylinder, forming an intake of the transfer channel. In piston 4 of the master cylinder 1 are still provided two parallel annular seats, and in one of them (the right-hand one in FIG. 3) may be housed an annular packing 9, in general a O-ring of rubber, equipped with a ring 10 for sealing and sliding, in general formed of tetrafluoroethylene, as according to the known technique. The other annular seat 12-13 of piston 4 houses a packing 11, and the arrangement of these parts is such as to define a containment space suitable for allowing, in elastic conditions, a displacement of packing 11 capable of increasing in noticeable manner the volume of the space which is located on the packing side communicating with the transfer channel 7. In particular, in the shown embodiment, packing 11 is a O-ring, and the containment space 12-13 has an expanded portion 13 containing the packing 11, and extends into a gradually narrowing portion 12.

In the shown rest position, the two packings 9-10 and 11 are situated at both sides of the opening 8 being the intake of the transfer channel 7. In this shown rest position, the packings 9-10 and 11 delimit around the piston an annular space which communicates with the inner space of the transfer channel 7, but this annular space, unlike the known technique, is defined in a variable manner. In effect, a pressure increase of the liquid contained in the transfer channel 7 acts onto the packing 11 and displaces the same towards the narrowed portion 12 of the containment space 12-13. By being compressed and elastically deformed, packing 11 enters the narrowed containment space 12 and gives rise to an increase of the annular space communicating with the inner space of the transfer channel 7. This increase of the total space available to the thermally expanded liquid limits the pressure increase. For this reason, by giving suitable measures to the parts, the thermal expansion of the liquid, due to its heating, cannot give rise to a pressure increase capable of applying to the packings 9-10 and 11 a force sufficient for damaging, expelling or drawing out the same.

Of course, the own elasticity of the packing will bring again the packing 11 to its normal configuration when ceases the cause of its displacement. Alternatively, a separate elastic means M (diagrammatically shown in FIG. 3 by an arrow) may be suitably inserted in the containment space 12-13 along with packing 11, and the action of this elastic means M will bring again the packing 11 to its normal configuration when ceases the cause of its displacement.

Thus, when subsequently a braking operation is effected, the transfer channel 7 is put in communication with the inner space of at least one of the master cylinders 1, then the pressure increase due to the thermal expansion of the liquid ceases, and the elasticity of packing 11, or the action of the separate elastic means M, brings again the packing 11 to its normal configuration.

During a bilateral braking, obtained by simultaneously operating both the braking pedals, namely for example in a braking operation during the run on road, the pressure generated within the master cylinders 1 compresses the two packings 9-10 and 11 the one towards the other, and the valve V according to the invention behaves as a usual valve.

During a unilateral braking, obtained by operating only one braking pedal, namely for example during an agricultural work, the pressure generated by the operated master cylinder is intercepted by the balancing valve of the other not operated master cylinder, and therein it causes an elastic displacement of packing 11. As a consequence, an increase of the stroke of the operated braking pedal takes place, but this small stroke increase is completely negligible and unnoticed in this operating condition.

The arrangement, according to the invention, of a containment space suitable for allowing, in elastic conditions, a displacement of the packing capable of increasing in noticeable manner the volume of the space communicating with the transfer channel, can be embodied in various manners in addition to the shown arrangement, that represents a preferred example. According to this example the packing 11 may have per se the usual shape, and the possibility of its displacement as a consequence of an elastic deformation of the packing is entrusted entirely to the shape of the space 12-13 wherein the packing 11 is housed.

This space, as in the shown example, has preferably an expanded region 13, wherein the packing 11 is contained when it is in its conditions of minimum elastic deformation, and it has a gradually narrowing region 12, wherein the packing 11 can penetrate thanks to an increase of its elastic deformation. However, also other different shapings of the containment space may be chosen without modifying the obtained result.

As an alternative, the possibility of an elastic displacement of the packing as a consequence of its deformation can be entirely entrusted to a special shape of the packing itself. In this case, it is not needed that the containment space has any special configuration.

Finally, the possibility of an elastic displacement of the packing within the containment space can be ensured by an elastic means M contained, along with the packing 11, within the containment space.

Because a balancing valve V includes two annular packings, for the purposes of the invention it is sufficient that only one of these packings has the described features, whereas the other packing can preserve the usual arrangement, as it has been represented. However it is also possible to apply the characteristics according to the invention to both the packings of a balancing valve V.

Similarly, because there are two master cylinders 1 mutually connected by a transfer channel 7, it is sufficient that only one of the master cylinders includes a balancing valve V having the characteristics of the invention. However it is preferred, also for manufacture reasons, that both the master cylinders are equipped with a balancing valve V according to the invention.

It is to be understood that the invention is not limited to the embodiments described and, particularly, to the embodiment illustrated by way of example. Several possible modifications have been mentioned in the course of the description, and others are within the reach of those skilled in the art. These and other modifications and any replacement by technically equivalent means may be applied to what has been described and illustrated, without departing from the spirit of the invention as defined by the appended Claims.

The invention claimed is:

1. A balancing valve (V) for a braking system of a vehicle having two separate master brake cylinders (1) configured for independent braking of respective opposite wheels of the vehicle, the two master brake cylinders connected to each other by way of a transfer channel (7), the balancing valve (V) comprising:
    a piston configured to operate within one of the master brake cylinders, the piston comprising first and second containment spaces; and
    first and second ring packings (9,10,11) configured to cooperate with an intake (8) of the transfer channel (7), the first ring packing (11) being housed within the first containment space (12,13) of the piston,
    the first containment space (12,13) defined in cross-section by a top surface, a side surface, and a bottom surface,
    an expanded portion (13) of the containment space located where the top surface, side surface, and bottom surface meet,
    the top surface having a sloped portion that slopes toward the bottom surface as a function of increasing distance from the side surface to form a narrowed portion (12) of the containment space at a location distanced from the side surface such that a displacement of the first ring packing (11) from a rest position at the expanded portion (13), resulting from an operational pressure applied through the transfer channel (7), causes the first ring packing (11) to enter the narrowed portion (12) and increases a volume of a space around the piston that is in fluid communication with an inner space of the transfer channel,
    the first ring packing (11) configured to be contained within the expanded portion (13) under a condition of minimum elastic deformation, and the first ring packing (11) configured to penetrate into the narrowed portion (12) under a condition of increasing elastic deformation,
    the first ring packing (11) configured to occupy the expanded portion (13) in the rest position, and configured to be displaced into the narrowed portion (12) upon application of the operational pressure, the first ring packing (11) configured to elastically deform as the first ring packing (11) displaces into the narrowed portion (12),
    wherein the first ring packing (11) is an O-ring, and
    wherein the second ring packing (9,10) is housed in the second containment space, the second ring packing comprising an O-ring (9) within the interior of the second containment space and a peripheral ring (10), configured for sealing and sliding, located at an open end of the second containment space.

2. The balancing valve (V) as set forth in claim 1, further comprising:
    an elastic element (M) arranged in the first containment space for operationally returning the first ring packing (11) to the rest position when the operational pressure is released.

3. The balancing valve (V) as set forth in claim 1, wherein an elasticity of the first ring packing (11) is sufficient to urge the first ring packing (11) from an operational position in the narrowed portion (12) into the rest position of the expanded portion (13) upon a release of the operational pressure.

4. The balancing valve (V) as set forth in claim 1, wherein the bottom wall of the containment space is formed in a cylinder wall of the one of the two master brake cylinders (1), and the top and side walls of the containment space is formed as a cavity in a surface of the piston (4).

* * * * *

UNITED STATES PATENT AND TRADEMARK OFFICE
CERTIFICATE OF CORRECTION

PATENT NO.       : 8,522,935 B2                                                Page 1 of 1
APPLICATION NO.  : 12/744705
DATED            : September 3, 2013
INVENTOR(S)      : Leonardo Cadeddu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 237 days.

Signed and Sealed this

Fifteenth Day of September, 2015

Michelle K. Lee
*Director of the United States Patent and Trademark Office*